United States Patent
Kock et al.

(10) Patent No.: US 9,611,382 B2
(45) Date of Patent: Apr. 4, 2017

(54) POLYOLEFINS COMPOSITION WITH LOW CLTE AND REDUCED OCCURRENCE OF FLOW MARKS

(75) Inventors: Cornelia Kock, Pucking (AT); Michael Tranninger, Pucking (AT)

(73) Assignee: Borealis AG (AT)

( * ) Notice: Subject to any disclaimer, the term of this patent is extended or adjusted under 35 U.S.C. 154(b) by 272 days.

(21) Appl. No.: 14/002,328

(22) PCT Filed: Mar. 2, 2012

(86) PCT No.: PCT/EP2012/053602
§ 371 (c)(1),
(2), (4) Date: Feb. 22, 2014

(87) PCT Pub. No.: WO2012/117086
PCT Pub. Date: Sep. 7, 2012

(65) Prior Publication Data
US 2015/0166776 A1  Jun. 18, 2015

(30) Foreign Application Priority Data
Mar. 3, 2011 (EP) .................................... 11156746

(51) Int. Cl.
*C08L 23/12* (2006.01)

(52) U.S. Cl.
CPC ......... *C08L 23/12* (2013.01); *C08L 2205/025* (2013.01); *C08L 2205/035* (2013.01); *C08L 2205/24* (2013.01); *C08L 2207/02* (2013.01)

(58) Field of Classification Search
CPC ............... C08L 23/12; C08L 2205/025; C08L 2205/035; C08L 2205/24; C08L 2207/02; C08L 23/0815; C08K 3/34
USPC .......................................................... 524/151
See application file for complete search history.

(56) References Cited

FOREIGN PATENT DOCUMENTS

| | | |
|---|---|---|
| JP | 2003-301086 A | 10/2003 |
| WO | 2010006999 A1 | 1/2010 |
| WO | 2010142540 A1 | 12/2010 |
| WO | 2010149529 A1 | 12/2010 |

OTHER PUBLICATIONS

Notice of Opposition for European Application No. 12707091.0-1302/2681277 dated Apr. 4, 2016.

*Primary Examiner* — Susannah Chung
*Assistant Examiner* — Josephine Chang
(74) *Attorney, Agent, or Firm* — Tarolli, Sundheim, Covell & Tummino LLP

(57) ABSTRACT

The invention relates to a novel polyolefin composition having a low coefficient of thermal expansion (CLTE) and having a reduced occurrence of flow marks. The novel polyolefin compositions comprise a heterophasic polypropylene composition, ethylene/1-butene elastomer and an inorganic filler.

10 Claims, 1 Drawing Sheet

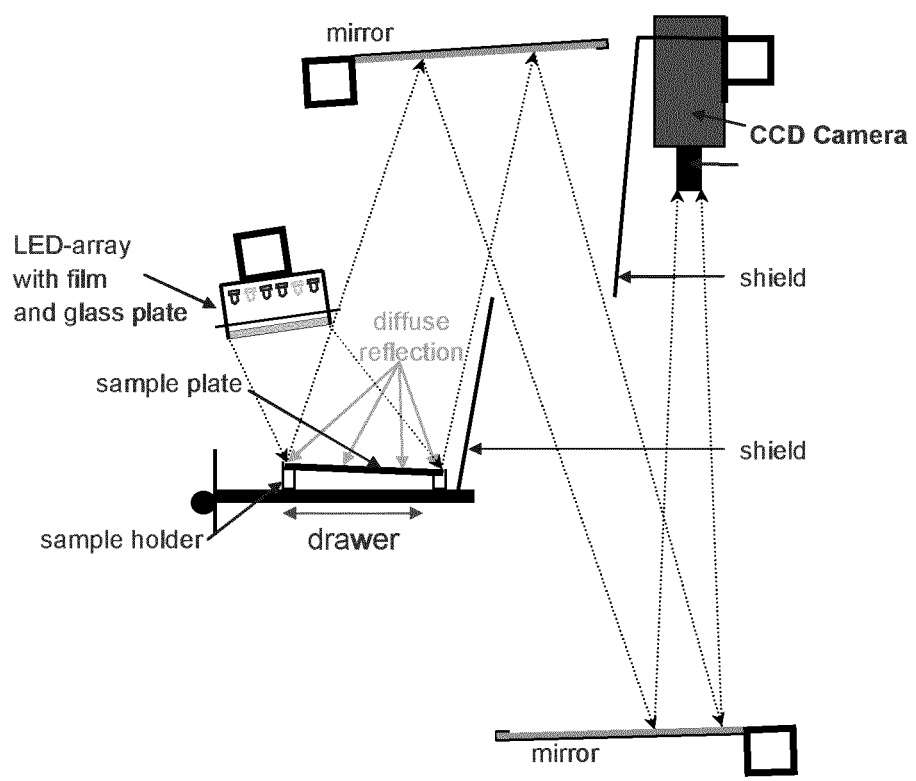
Measurement setup

POLYOLEFINS COMPOSITION WITH LOW CLTE AND REDUCED OCCURRENCE OF FLOW MARKS

The invention relates to a novel polyolefin composition having a low coefficient of thermal expansion (CLTE) and having a reduced occurrence of flow marks. More particularly, the invention relates to a polyolefin composition which comprises a heterophasic polypropylene composition, ethylene/1-butene elastomer and an inorganic filler.

The polyolefin compositions of the present invention are especially useful for automotive applications, in particular for automotive exterior parts, which require a good balance of impact strength and stiffness, e.g. bumpers, which further require "Class A" surface properties and low thermal expansion.

BACKGROUND OF THE INVENTION

Modern polymer materials for exterior automotive parts are often comprised of blends of polypropylene resins. Polypropylene resins are normally crystalline and have low impact resistance, especially at low temperatures. To improve the impact resistance, polypropylene can be blended with polyethylene or ethylene copolymers and rubber-like material, such as polyisobutylene, polybutadiene or ethylene-α-olefin based copolymers.

Normally the resins are then injection moulded into the desired articles. If the articles are relatively large, such as for example automobile bumpers, instrument panels or centre-consoles, the problem of optical irregularities arises, due to the necessary long flow paths of the resin.

Such surface defects, which are also known as flow marks, tiger stripes or flow lines, are deteriorating the surface aesthetics since they manifest, during injection moulding, as a series of alternating high and low gloss strips perpendicular to the direction of the melt flow.

Many attempts to avoid these surface defects, while keeping a good balance of other physical properties, have been made, e.g. DE 19754061. It has however been found, that either the occurrence of flow marks could not be sufficiently prevented, or the mechanical properties of the polymer compositions were unsatisfactory.

A further requirement for automotive parts is a low Coefficient of Linear Thermal Expansion (CLTE), i.e. in automotive parts their CLTE should be as close as possible to that of adjacent steel parts. Without a low CLTE, parts made of such polymer materials would be easily deformed due to the difference between their CLTE and that of the automotive body parts. Conventionally a low CLTE of polypropylene can be achieved with the addition of an inorganic filler such as talc.

Object

It is therefore the object of the present invention to provide a polyolefin composition having a low CLTE and a reduced tendency to flow marks.

Surprisingly, the above object could be achieved with polyolefin composition comprising a. 35-90 wt %, based on the weight of the polyolefin composition, of a heterophasic polypropylene composition comprising
 i. 10-50 wt %, based on the weight of the heterophasic polypropylene composition, of a first propylene homopolymer (PPH1) having an $MFR_2$ measured according to ISO 1133 of from 30-80 g/10 min (230° C., 2.16 kg),
 ii. 20-65 wt %, based on the weight of the heterophasic polypropylene composition, of a second propylene homopolymer (PPH2) having an $MFR_2$ measured according to ISO 1133 of from 100-250 g/10 min (230° C., 2.16 kg),
 iii. 5-30 wt %, based on the weight of the heterophasic polypropylene composition of a first xylene cold soluble fraction (XS1) having an intrinsic viscosity $IV_{XS1}$ of 2.0-3.0 dl/g,
 iv. 5-25 wt %, based on the weight of the heterophasic polypropylene composition of a second xylene cold soluble (XS2) fraction having an intrinsic viscosity $IV_{XS2}$ of 1.5-2.8 dl/g,
 with the proviso that $IV_{XS1} \neq IV_{XS2}$,
b. 5-40 wt %, based on the weight of the polyolefin composition, of an inorganic filler, and
c. 5-25 wt %, based on the weight of the polyolefin composition, of an ethylene/1-butene elastomer.

As will be shown in the examples section, the polyolefin compositions according to the invention have both a low CLTE −30/+80° C. (<49 μm/m·K) and a low CLTE +23/+80° C. (<57 μm/m·K), and a very low tendency to exhibit flow marks on injection moulded specimens. The low tendency to exhibit flow marks is especially pronounced at high injection speeds.

Other important mechanical properties, like stiffness, impact strength, shrinkage and heat deflection temperature are also on a high level, comparable with the tested comparative examples.

According to the invention, the polyolefin composition comprises 35-90 wt % of a heterophasic polypropylene composition. Preferably the amount of the heterophasic polypropylene composition is at least 45 wt %, more preferably at least 50 wt %, still more preferably at least 55 wt %, most preferably at least 60 wt %. Preferably the amount of the heterophasic polypropylene composition is not more than 85 wt %, more preferably not more than 80 wt %, still more preferably not more than 75 wt %, most preferably not more than 70 wt %.

If the amount of the heterophasic polypropylene composition is below 35 wt %, impact strength of the polyolefin composition would be reduced. If the amount of the heterophasic polypropylene composition is above 90 wt % the stiffness would be reduced and CLTE would become too large.

The heterophasic polypropylene composition which is used according to the invention comprises a continuous matrix phase and a discontinuous phase.

The continuous matrix phase of the heterophasic polypropylene composition comprises two propylene homopolymers having different $MFR_2$ measured according to ISO 1133.

According to the invention, the first propylene homopolymer (PPH1) has an $MFR_2$ of from 30-80 g/10 min (230° C., 2.16 kg) and is present in an amount of 10-50 wt %, based on the weight of the heterophasic polypropylene composition.

According to a more preferred embodiment, the $MFR_2$ of PPH1 is from 35-75 g/10 min, still more preferable from 40-70 g/10 min, even more preferably from 45-65 g/10 min, most preferably from 50-60 g/10 min (230° C., 2.16 kg).

The lower limit for the amount of PPH1 is more preferably at least 15 wt %, still more preferably at least 20 wt %, even more preferably at least 24 and most preferably at least 27 wt %, based on the weight of the heterophasic polypropylene composition.

The upper limit for the amount of PPH1 is more preferably not more than 45 wt %, still more preferably not more than 40 wt %, even more preferably not more than 36 and most preferably not more than 33 wt %, based on the weight of the heterophasic polypropylene composition.

According to the invention, the second propylene homopolymer (PPH2) has an $MFR_2$ of from 100-250 g/10 min (230° C., 2.16 kg) and is present in an amount of 20-65 wt %, based on the weight of the heterophasic polypropylene composition.

According to a more preferred embodiment, the $MFR_2$ of PPH2 is from 110-230 g/10 min, still more preferable from 120-210 g/10 min, even more preferably from 130-190 g/10 min, most preferably from 140-180 g/10 min (230° C., 2.16 kg).

The lower limit for the amount of PPH2 is more preferably at least 25 wt %, still more preferably at least 30 wt %, even more preferably at least 34 wt % and most preferably at least 38 wt %, based on the weight of the heterophasic polypropylene composition.

The upper limit for the amount of PPH2 is more preferably not more than 60 wt %, still more preferably not more than 55 wt %, even more preferably not more than 51 wt % and most preferably not more than 47 wt %, based on the weight of the heterophasic polypropylene composition.

The specific selection of two propylene homopolymers with different $MFR_2$ ensures that on the one hand the overall polyolefin composition has the required stiffness, to which the homopolymer with the lower $MFR_2$ contributes and that it simultaneously has a high flowability, which is helped by the homopolymer with the higher $MFR_2$.

If the amount of PPH1 is below 10 wt % or the amount of PPH2 above 65 wt %, based on the weight of the heterophasic polypropylene composition, stiffness of the polyolefin composition becomes too small. If the amount of PPH1 is above 50 wt % or the amount of PPH2 below 20 wt %, based on the weight of the heterophasic polypropylene composition, flowability of the polyolefin composition becomes insufficient.

The discontinuous phase of the heterophasic polypropylene composition comprises two ethylene-propylene rubbers with different molecular weights.

Since the major amount of an ethylene-propylene rubber is soluble in xylene (XCS content . . . xylene cold soluble content) at ambient temperature, the XCS content of the heterophasic polypropylene composition is related to the amount of ethylene-propylene rubber, but it is not necessarily exactly the same. For example, the ethylene-propylene rubber may also comprise a portion with very high ethylene concentration, which is crystalline and would therefore be insoluble in cold xylene.

For the purpose of this invention, the molecular weight of an ethylene-propylene rubber is expressed as the intrinsic viscosity of a certain xylene cold soluble fraction of the heterophasic polypropylene composition.

Accordingly, the heterophasic polypropylene composition which is used according to the invention comprises a first xylene cold soluble fraction (XS1) having an intrinsic viscosity IV of 2.0-3.0 dl/g in an amount of 5-30 wt %, based on the weight of the heterophasic polypropylene composition.

According to a more preferred embodiment the lower limit of the IV of XS1 is at least 2.1 dl/g, still more preferably at least 2.2 dl/g, even more preferably at least 2.3 dl/g and most preferable at least 2.4 dl/g.

According to a more preferred embodiment the upper limit of the IV of XS1 is not more than 2.9 dl/g, still more preferably not more than 2.8 dl/g, even more preferably not more than 2.7 dl/g and most preferable not more than 2.6 dl/g.

The lower limit for the amount of XS1 is more preferably at least 8 wt %, still more preferably at least 10 wt %, even more preferably at least 12 wt % and most preferably at least 14 wt %, based on the weight of the heterophasic polypropylene composition.

The upper limit for the amount of XS1 is more preferably not more than 25 wt %, still more preferably not more than 22 wt %, even more preferably not more than 20 wt % and most preferably not more than 18 wt %, based on the weight of the heterophasic polypropylene composition.

Accordingly, the heterophasic polypropylene composition which is used according to the invention comprises a second xylene cold soluble fraction (XS2) having an intrinsic viscosity IV of 1.5-2.8 dl/g in an amount of 5-25 wt %, based on the weight of the heterophasic polypropylene composition.

According to a more preferred embodiment the lower limit of the IV of XS2 is at least 1.7 dl/g, still more preferably at least 1.8 dl/g, even more preferably at least 1.9 dl/g and most preferably at least 2.0 dl/g.

According to a more preferred embodiment the upper limit of the IV of XS2 is not more than 2.7 dl/g, still more preferably not more than 2.6 dl/g, even more preferably not more than 2.5 dl/g and most preferable not more than 2.4 dl/g.

The lower limit for the amount of XS2 is more preferably at least 7 wt %, still more preferably at least 8 wt %, even more preferably at least 9 wt % and most preferably at least 10 wt %, based on the weight of the heterophasic polypropylene composition.

The upper limit for the amount of XS2 is more preferably not more than 21 wt %, still more preferably not more than 17 wt %, even more preferably not more than 14 wt % and most preferably not more than 12 wt %, based on the weight of the heterophasic polypropylene composition.

The specific selection of ethylene-propylene rubbers and thus of first and second xylene cold soluble fractions having different molecular weights (i.e. "bimodal rubber") ensures that the overall polyolefin composition has sufficient impact strength both at ambient and at low temperatures. The presence of a bimodal rubber in the polyolefin composition also helps to reduce the occurrence of flow marks.

If the amounts of XS1 and XS2 are lower than claimed, the impact strength of the polyolefin composition is unsatisfactory. If the amounts of XS1 and XS2 are higher than claimed, the stiffness of the polyolefin composition is unsatisfactory.

As already mentioned above, the molecular weights of both ethylene-propylene rubbers are different from each other. Accordingly, it is required that IV of XS1 is not equal to IV of XS2. More preferably $IV_{XS1} > IV_{XS2}$, still more preferably $IV_{XS1} > IV_{XS2} + 0.1$, most preferably $IV_{XS1} > IV_{XS2} + 0.2$.

According to an embodiment of the present invention, the first and the second xylene cold soluble fractions are not present in the same amount. It is therefore preferred that the amount of XS1 is larger than the amount of XS2, more preferably the amount of XS1 is larger than the amount of XS2 by more than 2 wt %, still more preferably by more than 3 wt %, most preferably by more than 4 wt %, in each case based on the weight of the heterophasic polypropylene composition.

A further parameter, which is useful to fine tune the properties of the polyolefin composition of the present invention is the ethylene content of the xylene cold soluble fractions XS1+XS2 of the heterophasic polypropylene composition. It has been found that a rather low ethylene content helps to ensure a favourable ratio between impact strength and CLTE. Accordingly, the ethylene content of the xylene cold soluble fractions of the heterophasic polypropylene composition is in the range of from 20-50 wt %, preferably 25-45 wt %, more preferably 30-45 wt %, most preferably 32-42 wt %.

According to a further embodiment of the present invention, the ethylene content of the xylene cold soluble fraction XS1 is comparable to the ethylene content of the xylene cold soluble fraction XS2. Accordingly the ethylene content of XS1 is between 80-120% of the ethylene content of XS2, more preferably the ethylene content of XS1 is between 90-110% of the ethylene content of XS2, still more preferably the ethylene content of XS1 is between 95-105% of the ethylene content of XS2 and most preferably the ethylene content of XS1 equal to the ethylene content of XS2.

According to a further embodiment of the present invention the first and second propylene homopolymer are not present in the same amount. Accordingly, it is preferred that the amount of PPH2 is larger than the amount of PPH1, more preferably the amount of PPH2 is larger than the amount of PPH1 by more than 4 wt %, still more preferably by more than 7 wt %, still more preferably by more than 10 wt %, in each case based on the weight of the heterophasic polypropylene composition.

According to advantageous embodiment of the invention, the heterophasic polypropylene composition is comprised of 45-90 wt % of propylene homopolymers PPH1 and PPH2 and 10-55 wt % of xylene soluble fractions XS1 and XS2. Preferably the amount of propylene homopolymers is 50-85 wt %, more preferably 55-80 wt %, still more preferably 60-75 wt %. Accordingly, the preferred amount of xylene soluble fraction is 15-50 wt %, more preferably 20-45 wt %, still more preferably 25-40 wt %.

A carefully selected ratio of propylene homopolymers to xylene soluble fractions contributes to the impact strength of the polyolefin composition and also to shrinkage behaviour.

In order to reach the desired level of stiffness and CLTE, the polyolefin composition of the invention comprises an inorganic filler in a selected amount. Accordingly, the polyolefin composition according to the present invention comprises an inorganic filler in an amount of from 5-40 wt %.

The lower limit for the amount of inorganic filler is more preferably at least 10 wt %, still more preferably at least 13 wt %, even more preferably at least 16 wt % and most preferably at least 18 wt %, based on the weight of the polyolefin composition.

The upper limit for the amount of inorganic filler is more preferably not more than 35 wt %, still more preferably not more than 30 wt %, even more preferably not more than 26 wt % and most preferably not more than 22 wt %, based on the weight of the polyolefin composition If the amount of inorganic filler is above 40 wt %, the polyolefin composition does not have the necessary flowability and not the required impact strength. Also, occurrence of flow marks would be too high. If the amount of inorganic filler is below 5 wt %, its contribution to stiffness would be too low and CLTE too high.

The polyolefin composition according to the invention further comprises an ethylene/1-butene elastomer in an amount of from 5-25 wt based on the weight of the polyolefin composition.

It is usual to add ethylene/α-olefin elastomers to heterophasic polypropylene compositions in order to enhance their impact strength.

It has now surprisingly been found, that when an ethylene/1-butene elastomer as a specific ethylene/α-olefin elastomer is added to a heterophasic polypropylene composition which has a bimodal propylene homopolymer matrix, a bimodal ethylene-propylene rubber discontinuous phase and which contains an inorganic filler, the CLTE as well as the occurrence of flow marks can be still further reduced (compared to an addition of just any ethylene/α-olefin elastomer or of one of the most often used ethylene/1-octene elastomers).

The lower limit for the amount of ethylene/1-butene elastomer is more preferably at least 7 wt %, still more preferably at least 8 wt %, even more preferably at least 9 wt % and most preferably at least 10 wt %, based on the weight of the polyolefin composition.

The upper limit for the amount of ethylene/1-butene elastomer is more preferably not more than 22 wt %, still more preferably not more than 19 wt %, even more preferably not more than 16 wt % and most preferably not more than 14 wt %, based on the weight of the polyolefin composition.

According to an embodiment of the present invention, the ethylene/1-butene elastomer has a density of from 850-880 $kg/m^3$.

Generally, in ethylene/α-olefin elastomers the density correlates with the α-olefin content with higher densities generally meaning lower α-olefin contents.

Accordingly, the lower limit for the density of the ethylene/1-butene elastomer is more preferably at least 853 $kg/m^3$, still more preferably at least 856 $kg/m^3$, even more preferably at least 858 $kg/m^3$ and most preferably at least 860 $kg/m^3$.

The upper limit for the density of the ethylene/1-butene elastomer is more preferably not more than 876 $kg/m^3$, still more preferably not more than 872 $kg/m^3$, even more preferably not more than 869 $kg/m^3$ and most preferably not more than 867 $kg/m^3$.

The MFR of the ethylene/1-butene elastomer which is used for the present invention is preferably selected—together with further properties described herein—to fine tune the impact properties of the polyolefin composition.

An advantageous MFR range for the ethylene/1-butene elastomer has been found to be from 0.5-10 g/10 min (190° C., 2.16 kg).

The lower limit for the MFR of the ethylene/1-butene elastomer is more preferably at least 0.8 min, still more preferably at least 1.0 g/10 min.

A more preferred upper limit for the MFR of the ethylene/1-butene elastomer is 8 g/10 min, still more preferably 7 g/10 min.

According to a preferred embodiment of the present invention, the inorganic filler is selected from the group consisting of talc and wollastonite.

According to a preferred embodiment of the present invention, the inorganic filler, which is used for the polyolefin composition has a median particle size ($D_{50}$) of 0.5-15 µm and a top cut ($D_{95}$) of 1-50 µm.

With $D_{50}$>15 µm and a top cut>50 µm, the reinforcing effect of the inorganic filler becomes too small. With $D_{50}$<0.5 µm and a top cut<1 µm, too many of the filler particles would be in the nanoscale range, which means that the energy which is required for a homogeneous distribution of the filler particles in the polyolefin becomes unfavourably large.

The median particle size $D_{50}$ is clearly defined, however, which fraction is used to define the top cut depends on the producer of the inorganic filler. A usual method for measuring particle size distribution is a laser diffraction method. Usual fractions defining the top cut of an inorganic filler are $D_{95}$, $D_{97}$ and $D_{98}$. For the present invention, the fraction $D_{95}$ is preferred for defining top cut.

An alternative way for defining top cut is to specify the fraction of filler particles having a diameter above a certain limit, i.e. the so-called screen residue.

According to this, it is preferred for the present invention that the amount of filler particles having a particle size of >15 μm to be not more than 5, more preferably not more than 3, still more preferably not more than 2%, even more preferably not more than 1%. According to a particularly preferred embodiment the amount of filler particles having a particle size of >15 μm shall not be more than 0.05%.

According to a still further preferred embodiment, the inorganic filler is talc.

According to a particularly preferred embodiment, the inorganic filler, which is used for the polyolefin composition of the present invention is talc which has a median particle size $D_{50}$ of 0.8-12 μm and a top cut ($D_{95}$) of 1.0-40 μm, still more preferred $D_{50}$ of 2.0-10 μm and top cut of 2-30 μm, most preferred $D_{50}$ of 1-5 μm and top cut ($D_{95}$) of 2-10 μm.

The MFR of the polyolefin composition can be selected to give optimum processability while maintaining all other desired properties. The MFR of the polyolefin composition is further selected such that it is suitable for a range of applications, particularly for moulding applications, especially injection moulding.

Accordingly, the MFR of the polyolefin composition is from 5-50 g/10 min. Preferably the MFR of the heterophasic propylene copolymer is 8-50 g/10 min, more preferably 10-40 g/10 min, still more preferably 13-30/10 min, most preferably 16-25 g/10 min.

According to an embodiment of the present invention, the polyolefin composition comprises at least one alpha-nucleating agent.

Generally, nucleating agents promote the formation of crystallization nuclei when a melt of polypropylene is solidified and are thus increasing the crystallization speed and temperature of nucleated polypropylene compared to non-nucleated polypropylene.

Polypropylene containing alpha nucleating agents shows improved mechanical properties, particularly stiffness and CLTE, but also HDT etc.

The polyolefin composition further contains up to 2 wt % of at least one alpha-nucleating agent. A lower limit of 0.001 wt % of alpha-nucleating agent is preferred. Preferably the polyolefin composition comprises 0.005 to 0.5 wt %, more preferably 0.01 to 0.3 wt %, most preferably 0.04-0.15 wt % of at least one alpha-nucleating agent.

Smaller amounts of alpha-nucleating agent than 0.001 wt % usually do not give the desired level of effect, while with larger amounts than 2 wt %, although giving the desired effect, the polyolefin compositions are becoming too expensive because of the high priced nucleating agents.

The alpha-nucleating agents which may be used for the polyolefin composition of the invention include organic alpha-nucleating agents selected from the group of phosphorus based nucleating agents like phosphoric acid esters metal salts represented by formula I

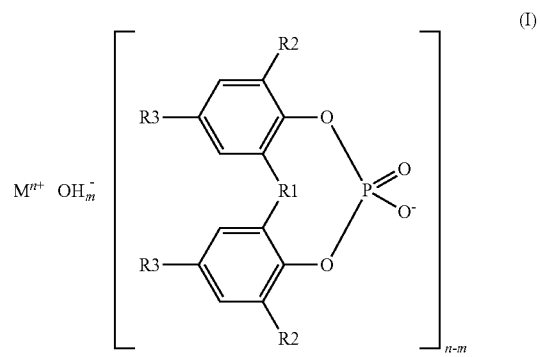

wherein R1 is oxygen, sulphur or a hydrocarbon group of 1 to 10 carbon atoms; each of R2 and R3 is hydrogen or a hydrocarbon or a hydrocarbon group of 1 to 10 carbon atoms; R2 and R3 may be the same or different from each other, two of R2, two of R3, or R2 and R3 may be bonded together to form a ring, M is a monovalent to trivalent metal atom; n is an integer from 1 to 3 and m is either 0 or 1, provided that n>m.

Preferred examples of the alpha nucleating agents represented by the above formula include sodium-2,2'-methylene-bis(4,6-di-t-butyl-phenyl)phosphate, sodium-2,2'-ethylidene-bis(4,6-di-t-butylphenyl)-phos-phate, lithium-2,2'-methylene-bis(4,6-di-t-butylphenyl)phosphate, lithium-2,2'-ethylidene-bis(4,6-di-t-butylphenyl)phosphate, sodium-2,2'-ethyli-dene-bis(4-i-propyl-6-t-butylphenyl)phosphate, lithium-2,2'-methylene-bis(4-methyl-6-t-butylphenyl)phosphate, lithium-2,2'-methylene-bis(4-ethyl-6-t-butylphenyl)phosphate, calcium-bis[2,2'-thiobis(4-methyl-6-t-butyl-phenyl)-phosphate], calcium-bis[2,2'-thiobis(4-ethyl-6-t-butylphenyl)-phosphate], calcium-bis[2,2'-thiobis(4,6-di-t-butylphenyl)phosphate], magnesium-bis[2,2'-thiobis(4,6-di-t-butylphenyl)phosphate], magnesium-bis[2,2'-thiobis(4-t-octylphenyl)phosphate], sodium-2,2'-butylidene-bis(4,6-dimethylphenyl)phosphate, sodium-2,2'-butylidene-bis(4,6-di-t-butyl-phenyl)-phosphate, sodium-2,2'-t-octylmethylene-bis(4,6-dimethyl-phenyl)-phosphate, sodium-2,2'-t-octylmethylene-bis(4,6-di-t-butylphenyl)-phosphate, calcium-bis[2,2'-methylene-bis(4,6-di-t-butyl-phenyl)-phosphate], magnesium-bis[2,2'-methylene-bis(4,6-di-t-butylphenyl)-phosphate], barium-bis[2,2'-methylene-bis(4,6-di-t-butylphenyl)-phosphate], sodium-2,2'-methylene-bis(4-methyl-6-t-butylphenyl)-phosphate, sodium-2,2'-methy-lene-bis(4-ethyl-6-t-butylphenyl)phosphate, sodium(4,4'-dimethyl-5,6'-di-t-butyl-2,2'-biphenyl) phosphate, calcium-bis-[(4,4'-dimethyl-6,6'-di-t-butyl-2,2'-biphenyl)phosphate], sodium-2,2'-ethyli-dene-bis(4-m-butyl-6-t-butyl-phenyl)-phosphate, sodium-2,2'-methylene-bis-(4,6-di-methylphenyl)-phos-phate, sodium-2,2'-methylene-bis(4,6-di-t-ethyl-phenyl)phosphate, potassium-2,2'-ethylidene-bis(4,6-di-t-butylphenyl)-phosphate, calcium-bis[2,2'-ethylidene-bis(4,6-di-t-butylphenyl)-phosphate], magnesium-bis[2,2'-ethyli-dene-bis(4,6-di-t-butylphenyl)-phosphate], barium-bis[2,2'-ethylidene-bis-(4,6-di-t-butylphenyl)-phosphate], aluminium-hydroxy-bis[2,2'-methylene-bis(4,6-di-t-butyl-phenyl)phosphate], aluminium-tris[2,2'-ethylidene-bis(4,6-di-t-butylphenyl)-phosphate].

A second group of phosphorus based nucleating agents includes for example aluminium-hydroxy-bis[2,4,8,10-tetrakis(1,1-dimethylethyl)-6-hydroxy-12H-dibenzo-[d,g]-dioxa-phoshocin-6-oxidato] and blends thereof with Li-myristate or Li-stearate.

Of the phosphorus based nucleating agents sodium-2,2'-methylene-bis(4,6-di-t-butylphenyl)phosphate or aluminium-hydroxy-bis[2,2'-methy-lene-bis(4,6-di-t-butyl-phenyl)-phosphate] or aluminium-hydroxy-bis-[2,4,8,10-tetrakis(1,1-dimethylethyl)-6-hydroxy-12H-dibenzo-[d,g]-dioxa-phoshocin-6-oxidato] or blends thereof with Li-myristate or Li-stearate are especially preferred.

Also sorbitol-based nucleating agents, like optionally substituted dibenzylidine sorbitol (e.g. 1,3:2,4 Dibenzylidene sorbitol, 1,3:2,4 Di(methylbenzylidene) sorbitol 1,3:2,4 Di(ethylbenzylidene) sorbitol, 1,3:2,4 Bis(3,4-dimethylbenzylidene) sorbitol, etc.) or pine rosin can be used as nucleating agents.

Further suitable alpha-nucleating agents are polymeric nucleating agents selected from the group consisting of vinylcycloalkane polymers and vinylalkane polymers. Nucleation with these polymeric nucleating agents is either accomplished by a special reactor technique, where the catalyst is prepolymerised with monomers like e.g. vinylcyclohexane (VCH), or by blending the propylene polymer with the vinyl(cyclo)alkane polymer. These methods are described in greater detail in e.g. EP 0 316 187 A2 and WO 99/24479, the disclosure of which is incorporated herein by reference.

Suitable alpha-nucleating agents for the polyolefin composition of the invention are in addition nucleating agents, as described for example in Macromolecules 2005, 38, 3688-3695, the disclosure of which is incorporated herein by reference.

Nucleating agents such as ADK NA-11 (Methylen-bis(4, 6-di-t-butylphenyl)phosphate sodium salt) and ADK NA-21 (comprising aluminium hydroxy-bis[2,4,8,10-tetrakis(1,1-dimethylethyl)-6-hydroxy-12H-dibenzo-[d,g]-dioxa-phoshocin-6-oxidato]) are commercially available from Asahi Denka Kokai and are among those which are preferably added to the polyolefin composition of the invention. Millad 3988 (3,4-Dimethylbenzylidene sorbitol), Millad 3905 and Millad 3940 available from Milliken & Company are other examples of nucleating agents that can be utilised in the invention.

Further commercial available alpha-nucleating agents, which can be used for the composition of the invention are, for example, Irgaclear XT 386 (N-[3,5-bis-(2,2-dimethylpropionylamino)-phenyl]-2,2-dimethylpropionamide) from Ciba Speciality Chemicals, Hyperform HPN-68L and Hyperform HPN-20E from Milliken & Company.

Among all alpha-nucleating agents mentioned above, aluminium hydroxy-bis[2,4,8,10-tetrakis(1,1-dimethylethyl)-6-hydroxy-12H-dibenzo-[d,g]-dioxa-phoshocin-6-oxidato] based nucleating agents like ADK NA-21, NA-21 E, NA-21 F, etc., sodium-2,2'-methylene-bis(4,6-di-t-butylphenyl)phosphate (ADK NA-11), aluminium-hydroxy-bis[2,2'-methylene-bis(4,6-di-t-butyl-phenyl)-phosphate], sorbitol-based nucleating agents like Millad 3988, Millad 3905 and Millad 3940 and polymeric nucleating agents selected from the group consisting of vinylcycloalkane polymers and vinylalkane polymers are particularly preferred.

According to an embodiment of the present invention, the at least one alpha-nucleating agent is comprised of a polymeric nucleating agent selected from the group consisting of vinylcycloalkane polymers and vinylalkane polymers, preferably poly-vinylcyclohexane (pVCH).

According to a further embodiment the at least one alpha-nucleating agent is selected from the group consisting of aluminium hydroxy-bis[2,4,8,10-tetrakis(1,1-dimethylethyl)-6-hydroxy-12H-dibenzo-[d,g]-dioxa-phoshocin-6-oxidato] based nucleating agents (e.g. ADK NA-21, NA-21 E, NA-21 F), sodium-2,2'-methylene-bis(4,6-di-t-butylphenyl)phosphate (ADK NA-11), aluminium-hydroxy-bis[2,2'-methylene-bis(4,6-di-t-butyl-phenyl)-phosphate] and sorbitol-based nucleating agents (e.g. Millad 3988, Millad 3905 and Millad 3940).

For the embodiment where the at least one alpha-nucleating agent is selected from the group consisting of vinylcycloalkane polymers and vinylalkane polymers, preferably poly-vinylcyclohexane (pVCH), the typical concentration of vinyl(cyclo)alkane polymer in the polyolefin composition is from 0.0001-1.0 wt %, preferably 0.0001-0.1 wt %, more preferably 0.001-0.05 wt %, most preferably 0.001-0.01 wt %.

For the embodiment, where the at least one alpha nucleating agent is not a polymeric nucleating agent, the nucleating agent is typically present in the polyolefin composition in an amount of from 0.001-1.0 wt %, preferably 0.001-0.5 wt %, more preferably 0.01-0.5 wt %, most preferably 0.01-0.3 wt %.

The polyolefin compositions which are used for the invention may contain various additives, which are generally used in polypropylene compositions, such as stabilizers, antioxidants, acid neutralizing agents, lubricants, ultraviolet absorbers, pigments, provided that they do not adversely affect the desired properties of the composition.

It is accordingly preferred, that the additives shall be not more than 10.0 wt %, preferably not more than 8.0 wt %, more preferably not more than 5.0 wt %, yet more preferably not more than 4.0 wt %, still more preferably not more than 3.0 wt %, in the total polyolefin composition.

Further the present polyolefin composition may comprise additional polymer components other than the heterophasic polypropylene composition and ethylene/1-butene elastomer. However the present invention is in particular directed to a polyolefin composition where the heterophasic polypropylene composition and the ethylene/1-butene elastomer together account for at least 90.0 wt % of all polymeric components of the polyolefin composition, preferably at least 93.0 wt %, more preferably at least 95.0 wt %, yet preferably at least 97.0 wt %, still more preferably at least 98.0 wt % of all polymeric components of the polyolefin composition.

The polyolefin compositions of the present invention are suitable for a wide range of applications.

They are particularly suitable for the production of moulded articles, in particular for the production of injection moulded articles. Preferred examples of such injection moulded articles are large parts for exterior applications in the automotive industry, in particular body panels.

Accordingly, a further aspect of the invention is a moulded article comprising a polyolefin composition as herein described.

A still further aspect of the invention is an injection moulded article comprising a polyolefin composition as herein described.

Compared to other polyolefin compositions, which are today used for similar or the same applications, the inventive polyolefin compositions have a unique balance of properties. They show a unique combination of low CLTE (<55 $\mu m/m \cdot K$) and little or no occurrence of flow marks. Also stiffness (Flexural modulus>1700 MPa) and HDT (>55° C.) are on a high level.

Accordingly, a further aspect of the invention is directed to using a polyolefin composition as herein described for producing injection moulded articles having the following properties:

a. CLTE −30/+80° C.<49 μm/m·K and
b. CLTE +23/+80° C.<57 μm/m·K

Description of Heterophasic Polypropylene Composition

A heterophasic polypropylene composition being utilized according to the invention has preferably a multiphase structure with a continuous propylene homopolymer matrix and inclusions comprising at least two amorphous ethylene-propylene rubbers, which is an elastomeric phase.

The homopolymer matrix comprises the propylene homopolymers PPH1 and PPH2. Optionally, the rubber also comprises some crystalline polyethylene.

Preferably each of the polypropylene homopolymer(s) is isotactic. The isotacticity of polypropylene is determined by $^{13}$C-NMR as triade percentage (mm %). Accordingly it is appreciated that the polypropylene homopolymer has a rather high triad percentage, i.e. higher than 90%, more preferably higher than 92%, still more preferably higher than 93%, even more preferably higher than 95% and most preferably higher than 98%.

Additionally it is appreciated that the polypropylene homopolymer(s) (PPH1, PPH2) as well as the total heterophasic polypropylene composition are not chemically modified as it is known for instance from high melt strength polymers (HMS-polymer). Thus the heterophasic polypropylene composition and/or the polypropylene homopolymer(s) (PPH1, PPH2) are not cross-linked. The impact behaviour can normally also be improved by using branched polypropylenes as for instance described in EP 0 787 750, i.e. single branched polypropylene types (Y-polypropylenes having a backbone with a single long side-chain and an architecture resembling a "Y"). Such polypropylenes are characterized by rather high melt strength. A parameter of the degree of branching is the branching index g'. The branching index g' correlates with the amount of branches of a polymer. The branching index g' is defined as $g'=[IV]_{br}/[IV]_{lin}$ in which g' is the branching index, $[IV]_{br}$ is the intrinsic viscosity of the branched polypropylene and $[IV]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17, 1301 (1949). This document is herewith included by reference. Thus it is preferred that the branching index g' of the polypropylene homopolymer(s) (PPH1, PPH2) shall be at least 0.85, more preferably at least 0.90, yet more preferably at least 0.95, like 1.00.

The expression propylene homopolymer used in the instant invention relates to a polypropylene that consists substantially, i.e. of at least 97 wt %, preferably of at least 98 wt %, more preferably of at least 99 wt %, still more preferably of at least 99.8 wt % of propylene units. In a preferred embodiment only propylene units in the propylene homopolymer are detectable. The comonomer content can be determined with FT infrared spectroscopy, as described below in the examples.

Each propylene homopolymer can be unimodal or multimodal, like bimodal in view of the molecular weight distribution.

The expression "multimodal" or "bimodal" used herein refers to the modality of the polymer, i.e.
the form of its molecular weight distribution curve, which is the graph of the molecular weight fraction as a function of its molecular weight.

As will be explained below, a propylene homopolymer can be produced in a single step or in a sequential step process, using reactors in serial or parallel configuration and which can be operated at different reaction conditions. As a consequence, each fraction prepared in a specific reactor can have its own molecular weight distribution.

When the distribution curves from these fractions are superimposed to obtain the molecular weight distribution curve of the final polymer, these curves may show two or more maxima or at least be distinctly broadened when compared with curves for the individual fractions. Such a polymer, produced in two or more serial or parallel steps, is called bimodal or multimodal, depending on the number of steps.

Accordingly the propylene homopolymer may be multimodal or bimodal in view of the molecular weight.

As a further requirement of the present invention the heterophasic propylene copolymer must comprise an ethylene-propylene rubber.

Like the polypropylene homopolymer the elastomeric ethylene-propylene rubber can be unimodal or multimodal, like bimodal. However it is preferred that the ethylene/propylene rubber is unimodal. Concerning the definition of unimodal and multimodal, like bimodal, it is referred to the definition above.

According to the present invention, there is also provided a process for the manufacture of the polyolefin composition discussed above. The ethylene-propylene rubber(s) may be blended with the polypropylene homopolymer(s) after their respective polymerizations and are subsequently mixed with the ethylene/1-butene elastomer and the inorganic filler and the optional alpha-nucleating agent. In an alternative method, a heterophasic polypropylene composition is produced in a multistage process, comprising at least four consecutive reactors and subsequently mixed with the ethylene/1-butene elastomer and the inorganic filler and the optional alpha-nucleating agent.

However, more desirably, two heterophasic propylene copolymers are produced in separate multistage processes and subsequently mixed with the ethylene/1-butene elastomer and the inorganic filler and the optional alpha-nucleating agent.

In a particularly preferred embodiment a polypropylene homopolymer PPH1 is produced in at least one slurry reactor or a slurry and a gas phase reactor and subsequently an ethylene-propylene-rubber is produced in at least one gas phase reactor to obtain a first heterophasic propylene copolymer. Further, a polypropylene homopolymer PPH2 is produced in at least one slurry reactor or a slurry and a gas phase reactor and subsequently an ethylene-propylene-rubber is produced in at least one gas phase reactor to obtain a second heterophasic propylene copolymer.

Accordingly each heterophasic propylene copolymer of the instant invention can be typically produced in a cascade of up to 4 reactors, where the first reactor is a liquid bulk reactor preferably of loop design, the second reactor is either a liquid bulk reactor preferably of loop design or a gas phase reactor and all subsequent reactors are gas phase reactors preferably of fluidized bed design. The components produced in the first two reactors is(are) crystallizable propylene homopolymer(s), while the component produced in the third and/or fourth reactor is a largely amorphous copolymer with higher amounts of comonomer. According to a specific embodiment, only three reactors are utilized with either two reactors producing homopolymer and the third reactor producing ethylene/propylene rubber or with one reactor producing homopolymer and two subsequent reactors producing ethylene/propylene rubber. According to another specific embodiment, only two reactors are used, one producing homopolymer and the second producing ethylene-propylene rubber.

In the following a preferred process is described in more detail: Such a process for the manufacture of the present invention comprises the following steps:
(i) polymerizing propylene in a first reactor system, preferably comprising a bulk loop reactor and an optional gas phase reactor, to obtain a polypropylene homopolymer PPH1
(ii) transferring the obtained propylene homopolymer PPH1 into a second reactor system preferably comprising at least one gas phase reactor,
(iii) polymerizing propylene and ethylene in said second reactor system in the presence of the polypropylene homopolymer to produce an ethylene-propylene rubber and to obtain a first heterophasic propylene copolymer containing PPH1 and XS1, and—independently from process steps (i) to (iii)
(iv) polymerizing propylene in a third reactor system, preferably comprising a bulk loop reactor and an optional gas phase reactor, to obtain a polypropylene homopolymer PPH2
(v) transferring the obtained propylene homopolymer PPH2 into a fourth reactor system preferably comprising at least one gas phase reactor,
(vi) polymerizing propylene and ethylene in said fourth reactor system in the presence of the polypropylene homopolymer PPH2 to produce an ethylene-propylene rubber and to obtain a second heterophasic propylene copolymer containing PPH2 and XS2, and
(vii) mixing, in particular melt mixing, the obtained first and second heterophasic propylene copolymers with ethylene/1-butene elastomer and inorganic filler.

The comonomer feeds into the various reactors may be adapted to produce the heterophasic propylene copolymer with the desired properties and the amounts of comonomer will be readily determined by the person skilled in the art.

Further details concerning the manufacture of heterophasic propylene copolymers (HECO) can be derived from WO 97/40080.

In such a procedure, the catalyst system used may be varied between stages but is preferably the same for all stages. Especially preferably a prepolymerized heterogeneous catalyst is used.

As a catalyst for the preparation of the heterophasic propylene copolymer preferably a Ziegler-Natta catalyst system is used. Such Ziegler-Natta catalyst systems are known in the art and comprise a catalyst component, a cocatalyst component and an external donor. The catalyst component of the catalyst system primarily contains magnesium, titanium, halogen and an internal donor. Electron donors control the stereospecific properties and/or improve the activity of the catalyst system. A number of electron donors including ethers, esters, polysilanes, polysiloxanes, and alkoxysilanes are known in the art.

The catalyst preferably contains a transition metal compound as a procatalyst component. The transition metal compound is selected from the group consisting of titanium compounds having an oxidation degree of 3 or 4, vanadium compounds, zirconium compounds, cobalt compounds, nickel compounds, tungsten compounds and rare earth metal compounds, titanium trichloride and titanium tetrachloride being particularly preferred.

It is preferred to use catalysts which can withstand the high temperatures prevailing in the loop reactor. The conventional Ziegler-Natta catalysts for isotactic polymerization of propylene generally have an operating temperature limit of around 80° C., above which they either become deactivated or lose their stereo-selectivity. This low polymerization temperature may put a practical limit on the heat removal efficiency of the loop reactor.

One preferred catalyst to be used according to the invention is disclosed in EP 591 224 which discloses a method for preparing a procatalyst composition from magnesium dichloride, a titanium compound, a lower alcohol and an ester of phthalic acid containing at least five carbon atoms. According to EP 591 224, a trans-esterification reaction is carried out at an elevated temperature between the lower alcohol and the phthalic acid ester, whereby the ester groups from the lower alcohol and the phthalic ester change places.

Magnesium dichloride can be used as such or it can be combined with silica, e.g. by absorbing the silica with a solution or slurry containing magnesium dichloride. The lower alcohol used may be preferably methanol or ethanol, particularly ethanol.

The titanium compound used in the preparation of the procatalyst is preferably an organic or inorganic titanium compound, which is at the oxidation state of 3 or 4. Also other transition metal compounds, such as vanadium, zirconium, chromium, molybdenum and tungsten compounds can be mixed with the titanium compound. The titanium compound usually is a halide or oxyhalide, an organic metal halide, or a purely metal organic compound in which only organic ligands have been attached to the transition metal. Particularly preferred are the titanium halides, especially titanium tetrachloride.

The alkoxy group of the phthalic acid ester used comprises at least five carbon atoms, preferably at least eight carbon atoms. Thus, as the ester may be used e.g. propylhexyl phthalate, dioctyl phthalate, di-isodecyl phthalate and ditridecyl phthalate. The molar ratio of phthalic acid ester and magnesium halide is preferably about 0.2:1.

The transesterification can be carried out, e.g. by selecting a phthalic acid ester—a lower alcohol pair, which spontaneously or by the aid of a catalyst, which does not damage the procatalyst composition, transesterifies the catalyst at an elevated temperature. It is preferred to carry out the transesterification at a temperature which is 110 to 115° C., preferably 120 to 140° C.

The catalyst is used together with an organometallic cocatalyst and with an external donor. Generally, the external donor has the formula $R_nR'_mSi(R''O)_{4-n-m}$ wherein
R and R' can be the same or different and represent a linear, branched or cyclic aliphatic, or aromatic group;
R'' is methyl or ethyl;
n is an integer of 0 to 3;
m is an integer of 0 to 3; and
n+m is 1 to 3.

In particular, the external donor is selected from the group consisting of cyclohexyl methylmethoxy silane (CHMMS), dicyclopentyl dimethoxy silane (DCPDMS), diisopropyl dimethoxy silane, di-isobutyl dimethoxy silane, and di-t-butyl dimethoxy silane.

An organoaluminium compound is used as a cocatalyst. The organoaluminium compound is preferably selected from the group consisting of trialkyl aluminium, dialkyl aluminium chloride and alkyl aluminium sesquichloride.

According to the invention, such catalysts are typically introduced into the first reactor only. The components of the catalyst can be fed into the reactor separately or simultaneously or the components of the catalyst system can be precontacted prior to the reactor.

Such precontacting can also include a catalyst prepolymerization prior to feeding into the polymerization reactor proper. In the prepolymerization, the catalyst components are contacted for a short period with a monomer before feeding to the reactor.

If the polyolefin composition comprises a polymeric nucleating agent which is accomplished by prepolymerising the catalyst with vinyl(clyclo)hexane, this is preferably also done in the catalyst prepolymerisation mentioned above.

As described above, after the manufacture of the heterophasic propylene copolymer the mixing with the ethylene/alpha-olefin and the inorganic filler and the alpha-nucleating agent(s) follows.

Production of Ethylene/α-Olefin Elastomer

The production of ethylene/α-olefin elastomer is described in detail in: Chum S P, Kao C I and Knight G W: *Structure, properties and preparation of polyolefins produced by single-site technology*. In: Metallocene-based Polyolefins—Volume 1, Scheirs J and Kaminsky W Eds, John Wiley and Sons Ltd, Chichester (West Sussex, England), 2000 pp. 262-264.

Alternatively, ethylene-1-butene elastomers, which are commercially available and which fulfill the indicated requirements, can be used.

Compounding

The heterophasic copolymers, the ethylene/1-butene elastomer, inorganic filler and the optional nucleating agent can be mixed, in particular melt blended, according to any conventional procedure known in the art.

The polyolefin compositions of the present invention are preferably produced by combining heterophasic propylene copolymers, the ethylene/1-butene elastomer, the inorganic filler, the optional alpha-nucleating agent and any additional additives, like pigments, stabilisers, processing aids, etc. in a melt mixing device.

Melt mixing devices suited for this process are discontinuous and continuous kneaders, twin screw extruders and single screw extruders with special mixing sections and co-kneaders. The residence time must be chosen such that a sufficiently high degree of homogenisation is achieved.

Measurement Methods

XCS

Xylene cold solubles are determined at 23° C. according ISO 6427. Xylene solubles are defined as the percent by weight that stays in solution after the polymer sample is dissolved in hot xylene and the solution is allowed to cool to 23° C.

MFR

The melt flow rates were measured with a load of 2.16 kg at 230° C. for polypropylene and the inventive polyolefin compositions of the examples. The melt flow rate is measured with a load of 2.16 kg at 190° C. for the ethylene/alpha-olefin elastomers. The melt flow rate is that quantity of polymer in grams which the test apparatus standardised to ISO 1133 extrudes within 10 minutes at a temperature of 230° C. or 190° C. under a load of 2.16 kg.

Flexural Test

Flexural tests are performed according to ISO 178:2001 at +23° C. on injection moulded samples of 80×10×4 $mm^3$ prepared by injection moulding in line with ISO 1873-2. The flexural modulus (E-modulus) was calculated from the linear part of said flexural test results.

Charpy Notched Impact Test

Charpy impact strength was determined according to ISO 179-1eA:2000 on V-notched samples of 80×10×4 $mm^3$ at +23° C., −20° C. and −30° C. The test specimens were prepared by injection moulding in line with ISO 1873-2.

Intrinsic Viscosity

Intrinsic Viscosity was measured according to DIN ISO 1628-1 (October 1999) in Decalin at 135° C.

Density

Density was determined according to ISO 1183.

NMR-Spectroscopy Measurements:

The comonomer content was determined by quantitative nuclear magnetic resonance ($^{13}$C-NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g. "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

CLTE

The Coefficient of Linear Thermal Expansion was determined according to ISO 11359-2:1999 on 10 mm long pieces cut from injection moulded test specimens with dimensions of 80×10×4 $mm^3$ prepared according to ISO 1873-2. The measurement was performed between +23 and +80° C. as well as between −30 and +80° C. with a heating rate of 1° C./min.

Heat Deflection Temperature (HDT):

The HDT was determined on injection molded test specimens of 80×10×4 $mm^3$ prepared according to ISO 1873-2 and stored at +23° C. for at least 96 hours prior to measurement. The test was performed on flatwise supported specimens according to ISO 75, condition A, with a nominal surface stress of 1.80 MPa and according to ISO 75, condition B, with a nominal surface stress of 0.45 MPa.

Particle Size

Median particle size $D_{50}$ and top cut ($D_{95}$) are determined by laser diffraction according to ISO 13320-1:1999.

Shrinkage

The shrinkage is determined on centre gated, injection moulded circular disks (diameter 180 mm, thickness 3 mm, having a flow angle of 355° and a cut out of 5°). Two specimens are moulded applying two different holding pressure times (10 s and 20 s respectively). The melt temperature at the gate is 260° C., and the average flow front velocity in the mould 100 mm/s. Tool temperature: 40° C., back pressure: 600 bar After conditioning the specimen at room temperature for 96 hours the dimensional changes radial and tangential to the flow direction are measured for both disks. The average of respective values from both disks are reported as final results.

Flow Marks

The tendency to show flow marks was examined with a method as described below. This method is described in detail in WO 2010/149529, which is incorporated herein in its entirety.

An optical measurement system, as described by Sybille Frank et al. in PPS 25 Intern. Conf. Polym. Proc. Soc 2009 or Proceedings of the SPIE, Volume 6831, pp 68130T-68130T-8 (2008) was used for characterizing the surface quality.

This method consists of two aspects:

1. Image Recording:

The basic principle of the measurement system is to illuminate the plates with a defined light source (LED) in a closed environment and to record an image with a CCD-camera system.

A schematic setup is given in FIG. 1.

2. Image Analysis:

The specimen is floodlit from one side and the upwards reflected portion of the light is deflected via two mirrors to a CCD-sensor. The such created grey value image is analyzed in lines. From the recorded deviations of grey values the mean square error (MSE) is calculated allowing a quantification of surface quality, i.e. the larger the MSE value the more pronounced is the surface defect.

Generally, for one and the same material, the tendency to flow marks increases when the injection speed is increased.

For this evaluation plaques 210×148×3 $mm^3$ with grain VW K50 and a filmgate of 1.4 mm were used and were produced with five different injection speeds using screw speeds of 57, 50, 35, 17 and 8 mm/sec.

Further Conditions:

Melt temperature: 240° C.

Mould temperature 30° C.

Dynamic pressure: 10 bar hydraulic

The smaller the MSE value is at a certain injection speed, the smaller is the tendency for flow marks.

EXAMPLES

The following materials were used:

Polymer 1: Heterophasic propylene copolymer having an MFR of 11 g/10 min, with 65 wt % of a propylene homopolymer matrix (MFR=55 g/10 min) and 35 wt % of an ethylene-propylene rubber. XCS content is 35 wt %. IV of XCS is 2.5 dl/g. Ethylene content of XCS is 38 wt %. Polymer 1 further contains 0.1 wt % Pentaerythrityl-tetrakis (3-(3',5'-di-tert.butyl-4-hydroxyphenyl)-propionate and 0.1 wt % Tris (2,4-di-t-butylphenyl) phosphite and 0.05 wt % calcium stearate.

Polymer 2: Heterophasic propylene copolymer having an MFR of 70 g/10 min, with 80 wt % of a propylene homopolymer matrix (MFR=160 g/10 min) and 20 wt % of an ethylene-propylene rubber. XCS content is 20 wt %. IV of XCS is 2.2 dl/g. Ethylene content of XCS is 36 wt %. The heterophasic copolymer contains 35 ppm pVCH as polymeric nucleating agent. Polymer 2 further contains 0.05 wt % Pentaerythrityl-tetrakis(3-(3',5'-di-tert.butyl-4-hydroxyphenyl)-propionate and 0.05 wt % Tris(2,4-di-t-butylphenyl) phosphite and 0.25 wt % of glyceryl monostearate Talc: Jetfine 3CA, commercially available from Luzenac. Jetfine 3CA has a $D_{50}$ of 3.9 μm, a topcut ($D_{95}$) of 7.8 μm, both calculated from the particle size distribution measured by laser diffraction according to ISO 13320-1:1999 and a screen residue (determined by Alpine Airjet) of max. 0.05% of particles>15 μm.

EB 1: ethylene-1-butene copolymer having an MFR (190° C., 2.16 kg) of 5.0 g/10 min and a density of 865 $kg/m^3$. EB 1 is available as Engage 7447 from The Dow Chemical Company.

EB 2: ethylene-1-butene copolymer having an MFR (190° C., 2.16 kg) of 1.2 g/10 min and a density of 862 $kg/m^3$. EB 2 is available as Engage 7467 from The Dow Chemical Company.

EO 1: Ethylene-1-octene copolymer, having an MFR (190° C., 2.16 kg) of 0.5 g/10 min and a density of 863 $kg/m^3$. EB 3 is available as Engage 8180 from The Dow Chemical Company.

EO 2: Ethylene-1-octene copolymer, having an MFR (190° C., 2.16 kg) of 13.0 g/10 min and a density of 864 $kg/m^3$. EB 4 is available as Engage 8130 from The Dow Chemical Company.

EO 3: Ethylene-1-octene copolymer, having an MFR (190° C., 2.16 kg) of 1.0 g/10 min and a density of 870 $kg/m^3$. EB 5 is available as Engage 8100 from The Dow Chemical Company.

EO 4: Ethylene-1-octene copolymer, having an MFR (190° C., 2.16 kg) of 5.0 g/10 min and a density of 870 $kg/m^3$. EB 6 is available as Engage 8200 from The Dow Chemical Company.

EO 5: Ethylene-1-octene copolymer, having an MFR (190° C., 2.16 kg) of 30.0 g/10 min and a density of 870 $kg/m^3$. EB 7 is available as Engage 8400 from The Dow Chemical Company.

CB: carbon black masterbatch: 40 wt % carbon black+60 wt % LDPE.

AP: Additive package: 0.1 pbw Pentaerythrityl-tetrakis (3-(3',5'-di-tert.butyl-4-hydroxyphenyl)-propionate+0.1 pbw Tris(2,4-di-t-butylphenyl)phosphate+0.2 pbw % calcium stearate+1.1 pbw propylene homopolymer (MFR (230° C., 2.16 kg)=3 g/10 min).

TABLE 1

(example compositions)

|  |  | CE1 | CE2 | CE3 | CE4 | CE5 | IE1 | IE2 |
|---|---|---|---|---|---|---|---|---|
| polymer 1 | [wt %] | 30.0 | 30.0 | 30.0 | 30.0 | 30.0 | 30.0 | 30.0 |
| polymer 2 | [wt %] | 35.0 | 35.0 | 35.0 | 35.0 | 35.0 | 35.0 | 35.0 |
| EO 1 | [wt %] | 12.0 |  |  |  |  |  |  |
| EO 2 | [wt %] |  | 12.0 |  |  |  |  |  |
| EO 3 | [wt %] |  |  | 12.0 |  |  |  |  |
| EO 4 | [wt %] |  |  |  | 12.0 |  |  |  |
| EO 5 | [wt %] |  |  |  |  | 12.0 |  |  |
| EB 1 | [wt %] |  |  |  |  |  | 12.0 |  |
| EB 2 | [wt %] |  |  |  |  |  |  | 12.0 |
| talc | [wt %] | 20.0 | 20.0 | 20.0 | 20.0 | 20.0 | 20.0 | 20.0 |
| CB | [wt %] | 1.5 | 1.5 | 1.5 | 1.5 | 1.5 | 1.5 | 1.5 |
| AP | [wt %] | 1.5 | 1.5 | 1.5 | 1.5 | 1.5 | 1.5 | 1.5 |

TABLE 2

(properties of example compositions)

| Property | unit | CE1 | CE2 | CE3 | CE4 | CE5 | IE1 | IE2 |
|---|---|---|---|---|---|---|---|---|
| MFR | g/10' | 17.0 | 22.6 | 17.4 | 20.6 | 23.2 | 20.6 | 18.4 |
| Flexural Modulus | MPa | 1953 | 1836 | 1896 | 1819 | 1825 | 1850 | 1914 |
| Charpy 1eA +23° C. | $kJ/m^2$ | 56.7 | 47.6 | 52.7 | 48.9 | 40.0 | 44.7 | 51.3 |

TABLE 2-continued (properties of example compositions)

| Property | unit | CE1 | CE2 | CE3 | CE4 | CE5 | IE1 | IE2 |
|---|---|---|---|---|---|---|---|---|
| Charpy 1eA −20° C. | kJ/m$^2$ | 9.1 | 7.8 | 8.5 | 7.4 | 5.8 | 8.3 | 9.6 |
| Charpy 1eA −30° C. | kJ/m$^2$ | 6.7 | 5.7 | 6.5 | 5.6 | 4.9 | 6.1 | 7.2 |
| HDT A @ 1.8 MPa | ° C | 58 | 56 | 57 | 56 | 56 | 57 | 58 |
| HDT B @ 0.45 MPa | ° C | 106.7 | 104.0 | 102.5 | 100.4 | 101.9 | 104.3 | 104.7 |
| Shrinkage radial | % | 0.70 | 0.72 | 0.70 | 0.73 | 0.77 | 0.70 | 0.68 |
| Shrinkage tangential | % | 0.62 | 0.66 | 0.62 | 0.66 | 0.71 | 0.67 | 0.62 |
| CLTE −30/+80° C. | | 51 | 49 | 54 | 55 | 58 | 43 | 46 |
| CLTE +23/+80° C. | | 57 | 56 | 65 | 64 | 69 | 51 | 49 |
| MSE Screw speed mm/s | 57 | 11.2 | 15.7 | 11.2 | 16.3 | 18.0 | 9.2 | 7.2 |
| MSE Screw speed mm/s | 50 | 7.5 | 14.0 | 6.7 | 11.8 | 17.1 | 6.8 | 5.9 |
| MSE Screw speed mm/s | 35 | 3.6 | 6.4 | 3.7 | 7.1 | 6.4 | 3.5 | 3.4 |
| MSE Screw speed mm/s | 17 | 2.9 | 3.4 | 3.0 | 3.6 | 3.5 | 3.2 | 3.2 |
| MSE Screw speed mm/s | 8 | 2.1 | 2.3 | 2.4 | 2.2 | 2.2 | 2.1 | 2.1 |

It can be seen that for the inventive examples the CLTE is significantly smaller. Further, also the inventive compositions show a significantly smaller tendency to exhibit flow marks at high injection speeds.

The invention claimed is:

1. A polyolefin composition comprising:
  a. 35-90 wt %, based on the weight of the polyolefin composition, of a heterophasic polypropylene composition having a continuous matrix phase and a discontinuous phase, wherein the continuous matrix phase comprises two propylene homopolymers of different MFR2 and wherein the discontinuous phase comprises two ethylene-propylene rubbers with different molecular weight, and wherein the heterophasic polypropylene composition comprises:
    i. 10-50 wt %, based on the weight of the heterophasic polypropylene composition, of a first propylene homopolymer (PPH1) having an MFR$_2$ measured according to ISO 1133 of from 30-80 g/10 min (230° C., 2.16 kg),
    ii. 20-65 wt %, based on the weight of the heterophasic polypropylene composition, of a second propylene homopolymer (PPH2) having an MFR$_2$ measured according to ISO 1133 of from 100-250 g/10 min (230° C., 2.16 kg),
    iii. 5-30 wt %, based on the weight of the heterophasic polypropylene composition, of a first xylene cold soluble fraction (XS1) having an intrinsic viscosity IV$_{XS1}$ of 2.0-3.0 dl/g,
    iv. 5-25 wt %, based on the weight of the heterophasic polypropylene composition, of a second xylene cold soluble (XS2) fraction having an intrinsic viscosity IV$_{XS2}$ of 1.5-2.8 dl/g,
  with the proviso that IV$_{XS1}$≠IV$_{XS2}$,
  b. 5-40 wt %, based on the weight of the polyolefin composition, of an inorganic filler, and
  c. 5-25 wt %, based on the weight of the polyolefin composition, of an ethylene/1-butene elastomer;
wherein the polyolefin composition has a CLTE −30/+80° C.<49 μm/m·K, a CLTE +23/+80° C.<57 μm/m·K, and a flexural modulus>1700 MPa.

2. The polyolefin composition according to claim 1, wherein the ethylene/1-butene elastomer has a density of from 850-880 kg/m$^3$.

3. The polyolefin composition according to claim 1, wherein the ethylene/1-butene elastomer has an MFR$_2$ measured according to ISO 1133 of from 0.5-10 g/10 min (190° C., 2.16 kg).

4. The polyolefin composition according to claim 1, wherein the inorganic filler is selected from the group consisting of talc and wollastonite.

5. The polyolefin composition according to claim 1, wherein the MFR$_2$ measured according to ISO 1133 of the polyolefin composition is from 5.0-50 g/10 min (230° C., 2.16 kg).

6. The polyolefin composition according to claim 1, further comprising at least one alpha-nucleating agent.

7. The polyolefin composition according to claim 6, wherein the at least one alpha-nucleating agent is selected from the group consisting of aluminum hydroxy-bis[2,4,8,10-tetrakis(1,1-dimethylethyl)-6-hydroxy-12H-dibenzo-[d,g]-dioxa-phosphocin-6-oxidato] containing nucleating agents, sodium-2,2'-methylene-bis(4,6-di-t-butylphenyl) phosphate, aluminium-hydroxy-bis[2,2'-methylene-bis(4,6-di-t-butyl-phenyl)-phosphate], sorbitol based nucleating agents and polymeric nucleating agents.

8. The polyolefin composition according to claim 7, wherein the at least one alpha nucleating agent is a polymeric nucleating agent selected from the group consisting of vinylcycloalkane polymers and vinylalkane polymers.

9. A molded article comprising a polyolefin composition according to claim 1.

10. The molded article according to claim 9, being an injection moulded article.

* * * * *